July 21, 1942.                R. A. JOHNSON                2,290,333
                    FLANGED METAL PIPE WITH PLASTIC LINING
                           Filed Dec. 17, 1940
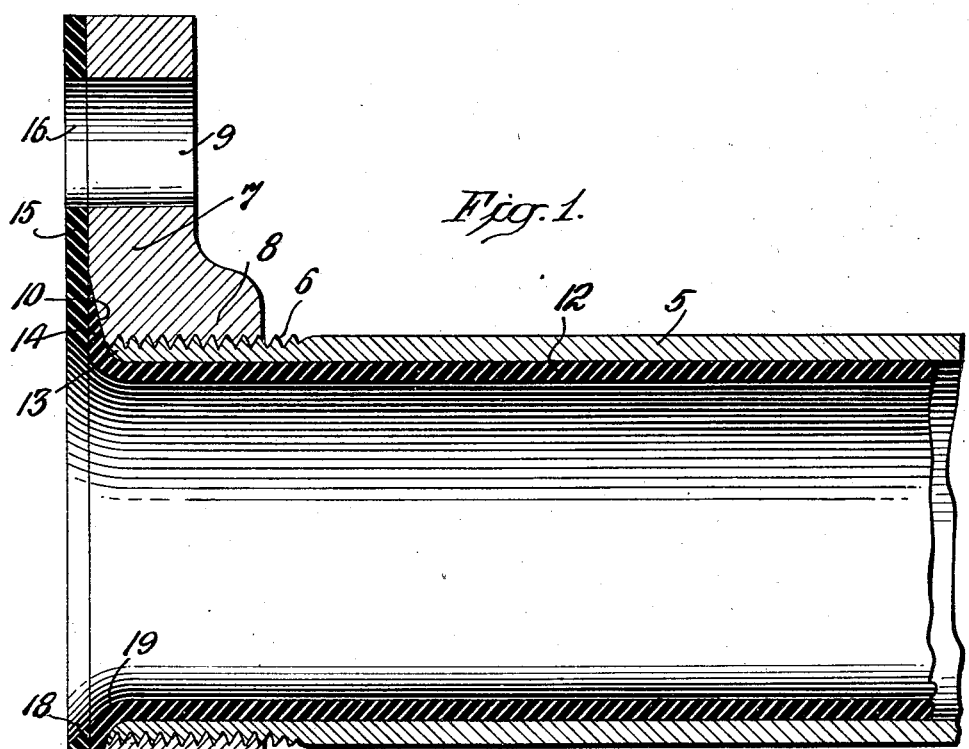
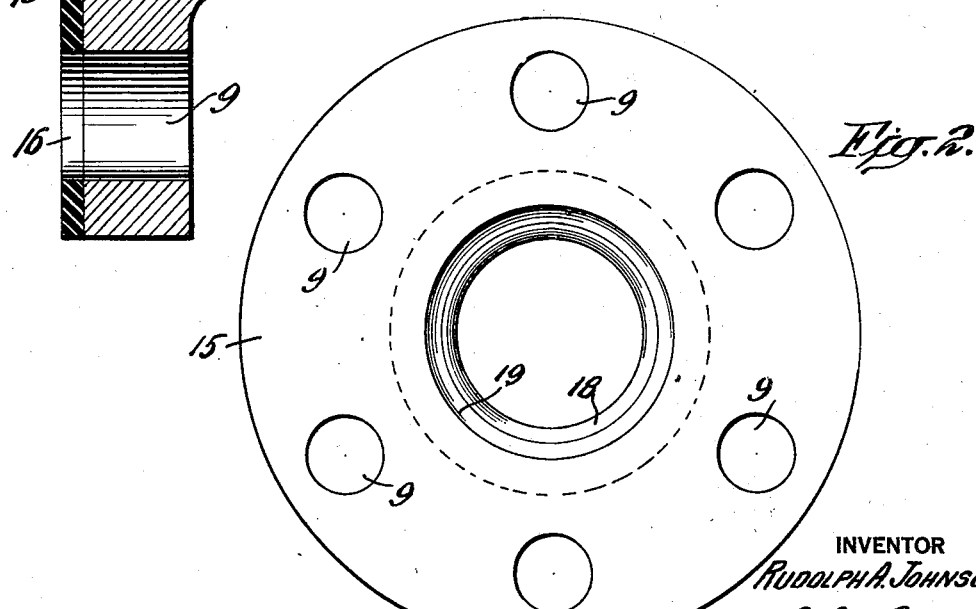
INVENTOR
*Rudolph A. Johnson*
BY
*English & Studwell*
ATTORNEYS Patented July 21, 1942

2,290,333

UNITED STATES PATENT OFFICE 2,290,333

FLANGED METAL PIPE WITH PLASTIC LINING

Rudolph A. Johnson, Brooklyn, N. Y., assignor to American Hard Rubber Company, New York, N. Y., a corporation of New York Application December 17, 1940, Serial No. 370,442

4 Claims. (Cl. 138—64)

The invention relates generally to an improvement in rubber-lined pipe constructions comprising a metal pipe with an offset element connected with one end of the pipe in the form of a flange an elbow a T or other pipe fitting. The rubber lining may be either hard or soft rubber. The invention is particularly directed toward the making of an improved joint between the rubber lining of the pipe and the rubber covering or lining the offset element or fitting. The invention will be understood by describing and illustrating it in connection with a rubber-lined metal pipe having a rubber-covered disk-like annular flange mounted on one end of the pipe, it being understood that although particularly described and illustrated for the sake of convenience, the invention is of general application in rubber-lined pipe constructions in which one end of the rubber-lined pipe is provided with a rubber-covered or lined offset element.

As applied to rubber-lined flanged pipes the construction with which the present invention is concerned comprises a straight metal pipe on one end of which is mounted a disk-like annular flange with a flat outer or face surface. Usually two such pipe structures are connected together with the flange faces abutting each other. When these pipe structures are used for the conveyance of corrosive fluids they are usually provided with acid-resisting, plastic linings, such as hard or soft rubber, attached to the interior of the pipes and to the outer faces of the flanges. Difficulty has been experienced heretofore in providing the flanged pipes with a satisfactory acid-resisting lining with respect to the joint between the pipe lining and the flange covering. In the manufacture of these pipes it has proved inexpedient, except in certain cases, to apply the uncured rubber composition as a unity to the interior of the pipe and to the outer face of the flange. The lining for the metal pipe is usually a tube, the outer surface of which, in the uncured state, is slightly larger in diameter than the inner diameter of the metal pipe so that when the rubber tube is forced into the metal pipe there will be a snug joint between them after the rubber tube has been vulcanized. The rubber covering of the outer face of the metal flange is in disk or annular form, and the problem has been to provide a satisfactory joint between the rubber tube and the rubber annulus.

If one end of the uncured rubber tube or pipe is left projecting beyond the plane of the outer face of the metal flange, two courses of procedure are available: In one case, the more or less plastic uncured rubber composition can be bent outwardly as a partial flange over the metal flange. In the case of relatively small pipes, it is inexpedient to flange the rubber tube more than about one half of an inch, if the rubber is kept at its original thickness, as otherwise the rubber flange would crack. The uncovered portion of the metal flange is then provided with a disk-like annulus of uncured rubber composition and a skived joint is made between the opening in the rubber annulus and the outer edge of the rubber flange. To effect a good joint between these two parts is a difficult operation, and is sometimes not satisfactory since there is liability of trapping air between them and the metal flange which would result in poor adherence of the rubber to the metal following vulcanization of the rubber.

In the case of pipes of relatively large diameter the projecting end of the uncured rubber tube can be stretched outwardly far enough as a flange to overlap the whole of the outer face of the metal flange, but in this operation the outer margin of the rubber flange is thinned out, so that the inner part of the rubber flange projects outwardly beyond the outer margin thereof, requiring the application thereto of an annulus of rubber tapering from its opening outwardly to make the outer face of the rubber flange normal with the axis of the pipe. This construction is entirely satisfactory, as a rubber lining, but the work required to produce it renders the construction relatively expensive.

A third arrangement which is sometimes resorted to consists in cutting off the outer end of the uncured rubber pipe short of the outer face of the metal flange and skiving it to form an outwardly directed flare. A disk-like annulus of rubber is then applied to the face of the metal flange and its inner end skived and turned inwardly over the skived outer end of the rubber tube. The joint thereby made is entirely satisfactory as a joint, but the inner diameter of the inwardly projecting part of the rubber flange at the point where it overlaps the skived outer end of the rubber tube is less than the diameter of the remainder of the tube, with the result that there is a restriction in the flow through the pipe which requires an increase of power for forcing liquid through it. Accordingly, in most instances this construction is objectionable.

The object of the present invention is the provision in a metal pipe construction having an offset element of an acid-resisting lining, such as rubber, which is entirely satisfactory in operation and can be manufactured with a minimum of time and material. To this end the invention consists in the improved rubber-lined metal pipe provided with an offset element hereinafter fully described and particularly pointed out in the appended claims.

In the accompanying drawing illustrating a preferred form of the invention, Fig. 1 is a longitudinal section through a flanged metal pipe provided with the improved rubber lining; and Fig. 2 is an end elevation, on a reduced scale, of the flange end of the pipe shown in Fig. 1.

The structure shown in the drawing comprises a metal pipe 5 having an external thread 6 on its outer end and an annulus-like flange 7 having an internally threaded hub 8 mounted on the threaded outer end of the pipe 5. The flange 7 is provided with the bolt-receiving holes 9. These parts are of conventional construction.

In providing the flanged metal pipe with the improved rubber lining of the present invention, the outer extremity 13 of the pipe terminates short of the outer face of the flange 7, and it and the adjacent portion of the outer face of the flange 7 are beveled, as shown in Fig. 1, to form the flat outwardly flaring surface 10. The depth of the base of the bevel 10 from the plane of the outer face of the flange and the outer diameter of the bevel will depend upon the thickness of the rubber tube lining the pipe. For a pipe of the internal diameter of that shown in Fig. 1, that is to say, about two and seven-eighths of an inch, the thickness of the rubber lining would be about three thirty-seconds of an inch; accordingly, the depth of the inner edge of the bevel from the plane of flange face should be about three thirty-seconds of an inch and the outer diameter of the bevel should be about one inch to one and one half inches greater than the inner diameter of the pipe 5. But these figures are entirely optional. The invention can be practiced successfully within a wide range of dimensions. The figures given are those which have proved satisfactory in actual use.

In applying the rubber lining to the flanged metal pipe as thus prepared the usual form of uncured rubber tube 12 is forced into the metal pipe 5 wth its outer end projecting some one-half inch or so beyond the outer face of the flange 7. This projecting end of the rubber tube is forced outwardly against the bevel surface 10 until a snug fit is made between it and the metal. Whatever rubber then projects outwardly beyond the outer face of the flange 7 is smoothed off flush with the face of the metal flange, with the result that the radially extending outer end of the rubber tube 12 is in the form of the tapered flange indicated at 14. To the outer face of the metal flange 7 and the outer face of the rubber flange 14 is applied an uncured rubber annulus 15 having holes 16 in alinement with the flange holes 9. The edges of the hole in the rubber annulus 15 are then skived or tapered outwardly at 18 to meet the bell portion 19 of the outer end of the rubber tube 12, so that there is produced at this point a smooth bell-like opening. The pipe structure as thus produced, is then placed in a vulcanizer for curing or vulcanizing the rubber.

It will be noted that by reason of this construction the passageway through the pipe is of uniform diameter and that the parts of the pipe construction are so arranged that the rubber lining can be expeditiously applied. Also there is a long smooth joint between the outer flanged end of the rubber tube 12 and the inner margin of the rubber annulus 15. Moreover, when two rubber covered flanges like those shown in Fig. 1 are bolted together the seams or joints on the inner part of the flanges are pressed together and there is therefore, no tendency for the joints to open up.

Having thus described the invention what I claim as new is:

1. A rubber-lined pipe construction comprising, a metal pipe, a metal offset element connected with one end of the pipe at an angle to the axis of the pipe and having a surface adjacent to the inner surface of the outer end of the pipe, the outer extremity of the pipe terminating short of the adjacent surface of the offset element, the surface of the outer extremity of the pipe and the adjacent part of the offset element being formed as an outwardly flaring flat surface, a rubber tube lining the pipe and having a radially-extending extremity covering the outwardly flaring surface of the pipe and the offset element, and a rubber layer covering the remainder of the surface of the offset element and overlapping the radially-extending portion of the rubber tube but terminating short of the plane of the interior of the lining.

2. A rubber-lined pipe construction comprising, a metal pipe, a flange-like element connected with one end of the pipe, the outer end of the pipe and the adjacent part of the flange element being formed as an outwardly flaring beveled surface, a rubber tube lining the pipe, the outer end of the rubber tube being flanged outwardly over the beveled metal surface, and a rubber layer covering the remainder of the adjacent surface of the flange element and overlapping the rubber flange but terminating short of the plane of the interior of the lining.

3. A hard rubber-lined flanged pipe construction comprising, a metal pipe, a disk-like metal flange mounted on the outer end of the metal pipe, the outer end of the metal pipe terminating short of the plane of the outer face of the metal flange, the surface of the outer end of the metal pipe and the adjacent portion of the metal flange forming a bell-like flat beveled orifice, a hard rubber tube lining the inner surface of the metal pipe and having a radially extending extremity overlapping the outer end of the metal pipe and the adjacent beveled part of the metal flange to constitute a tapered rubber flange, the outer surface of the rubber flange being flush with the outer face of the metal flange, and a disk-like annulus of hard rubber covering the outer face of the metal flange and the outer face of the hard rubber flange.

4. A hard rubber-lined flanged pipe construction comprising, a metal pipe, a disk-like metal flange mounted on one end of the pipe, the outer end of the metal pipe and the adjacent part of the metal flange being beveled outwardly, a hard rubber tube lining the inner surface of the metal pipe, the outer end of the rubber tube being flanged outwardly to cover the bevel in the outer end of the metal pipe and the adjacent part of the metal flange, the outer surface of the rubber flange being flush with the outer face of the metal flange, and a disk-like annulus of hard rubber covering the outer face of the metal flange and the outer face of the hard rubber flange.

RUDOLPH A. JOHNSON.